US005934024A

United States Patent [19]

Simpson

[11] Patent Number: 5,934,024

[45] Date of Patent: Aug. 10, 1999

[54] JAMB CONSTRUCTION FOR ENTRY DOORS

[76] Inventor: Danny W. Simpson, Rte. 1, Box 107, Concordia, Mo. 64020

[21] Appl. No.: 08/941,802

[22] Filed: Oct. 3, 1997

[51] Int. Cl.[6] .......... B60J 5/00

[52] U.S. Cl. .......... 49/462; 49/394

[58] Field of Search .......... 49/460, 462, 504; 52/211, 514; 292/340, 341.12; 16/388, 86 A, 86 B

[56] References Cited

U.S. PATENT DOCUMENTS

| | | | |
|---|---|---|---|
| 3,104,904 | 9/1963 | Jacobs | 292/340 |
| 3,918,207 | 11/1975 | Aliotta | 52/514 |
| 4,057,275 | 11/1977 | La Beaud | 292/340 |
| 4,416,087 | 11/1983 | Ghatak | 52/514 |
| 4,635,399 | 1/1987 | Gehrke et al. | 52/514 |
| 4,660,338 | 4/1987 | Wagner | 49/504 |
| 4,865,370 | 9/1989 | Francis | 292/340 |
| 5,016,930 | 5/1991 | Hamilton | 292/340 |
| 5,031,946 | 7/1991 | Yarrow | 49/462 |
| 5,070,650 | 12/1991 | Anderson | 49/460 |
| 5,241,790 | 9/1993 | Schimpf | 52/514 |
| 5,566,509 | 10/1996 | Long | 49/504 |

*Primary Examiner*—Daniel P. Stodola
*Assistant Examiner*—Curtis Cohen
*Attorney, Agent, or Firm*—Shook, Hardy & Bacon, L.L.P.

[57] ABSTRACT

A door jamb for enhancing the security of entry doors. L-shaped metal angle plates are secured to the edge portion of the jamb near the bolt passages for latching and locking bolts. Flanges of the plates extend along the jamb edge with flat bodies of the plates providing structural backing for the jamb in the gap between the jamb and wall framing. Smaller metal angle plates provide flanges which form borders of the bolt passages and which are spaced inwardly from the flanges of the larger plates. The spaces between the flanges receive cushions that provide a shock absorbing effect when efforts are made to break in the door.

10 Claims, 3 Drawing Sheets

JAMB CONSTRUCTION FOR ENTRY DOORS

FIELD OF THE INVENTION

This invention relates generally to door jambs and more particularly to an improved jamb which offers security against forced entry through residential entry doors.

BACKGROUND OF THE INVENTION

Residential doors are typically constructed either of wood or steel which encases wood laminate. The doors are either pre-hung or installed on site on wood door jambs. The door jambs are normally about 4⅝" wide and about ¾" thick. Pre-hung doors are installed in the rough door openings and are shimmed to a level and plumb condition by installing shims between the door jamb and the wall framing which surrounds the door opening. The gaps that receive the shims are typically about ⅛" to 3⁄16" wide, so the jamb is essentially suspended in the rough door opening with a gap around it containing the shims. The gaps are eventually covered up by trim such as door casing or moldings.

Many efforts have been made to enhance the security of entry doors in order to reduce forced entries. Steel laminate doors can be used to replace wood doors in order to increase the strength of the door itself. The bolt faces and sides can be equipped with wrap around metal covers in order to enhance their strength. The lock sets normally have sufficient structural integrity that they seldom fail during attempted break ins. Most often, successful forced entries result from the destruction of the door material surrounding the lock set and/or destruction of the jamb in the area which receives a dead bolt or other locking bolt. The vulnerable area of the door around the lock set can be adequately strengthened in a number of ways. However, due to space limitations and the lack of structural support resulting from the presence of a gap around the door jamb, attempts to significantly strengthen the jamb have not been successful.

The entry door is kicked inwardly during forced entry, and the force that is applied to the door is transferred to the dead bolt. The latch bolt is not really intended as a security device and projects only about ½" into the jamb, so it can be easily dislodged. The dead bolt is intended to provide security and usually projects about 1" so that it extends completely through the ¾ thick jamb. However, the dead bolt passage in the jamb is set back from the inside edge of the jamb by only about ½". Although a strike plate is normally installed on the jamb around the bolt passage, the strike plate is only 1⁄16" thick and is mounted with small screws about ¾" long.

When the door is forcefully kicked inwardly, the dead bolt acts as a lever against the jamb in the small area (¾" thick and about ½" wide) between the bolt passage and the inside edge of the door jamb. The force the bolt applies can easily destroy this part of the jamb and tear the strike plate away. The vulnerable area of the door jamb is made even weaker by the gap between the jamb and the solid wall framing, and also by the practice of locating the edge of the jamb flush with the finished wall. This practice results in the vulnerable area of the jamb being backed only by relatively weak wallboard rather than stronger framing.

Attempts that have been made to enhance the strength of the jamb have been unsuccessful. Providing long screws for the strike plates and/or strengthening the strike plates does not result in significant increased support for the vulnerable part of the jamb. The bolt still acts as a lever which can force the strike plate against the jamb and destroy the ½" of the jamb between the bolt and the jamb edge. Interior devices such as sliding bolts, hasps and security chains are often used, but these types of devices can be torn loose either from the door or from the surface around the door on which they are mounted.

SUMMARY OF THE INVENTION

The present invention is directed to a door jamb construction which provides security against forced entry and which is particularly characterized by strength in the door jamb area between the bolt passage and the adjacent edge of the jamb.

In accordance with the invention, a standard door jamb is modified by adding L-shaped plates in the areas near the latch bolt passage and the dead bolt passage. The plates have flat bodies which extend into and occupy the space between the jamb and the wall framing. Consequently, they rigidify and strengthen the mounting of the jamb and provide enhanced strength and backing in the otherwise vulnerable area near the strike plates. The L-shaped plates also have flanges which are recessed into the inside edge of the jamb.

A second set of smaller plates have bodies that occupy recesses formed in the larger plates. Flanges of the smaller plates are spaced inwardly from the flanges of the larger plates, and the flanges occupy the area of the jamb located between the bolts and the jamb edge.

It is a particular feature of the invention that a cushion is installed between the flanges of the larger and smaller plates. The cushion absorbs the shocks that are applied to the flanges by the bolt when efforts are made to kick the door or otherwise forcefully break the door open.

The invention is also characterized by a secure mounting system for the metal plates. Screws extend through the flanges of the larger plates and into the edge of the jamb on opposite sides of mortise areas of the jamb edge where the flanges are located. Larger screws extend through the jamb and the bodies of the plates well into the wall framing to securely anchor the plates to the framing studs. The long screws which anchor the smaller plates are also used to mount the strike plates.

It is another important feature of the invention that the aesthetics of the door jamb are preserved. When the jamb is installed, only the flanges of the larger plates are exposed to view, and they are largely covered by the door casing. The parts of the flanges that remain visible are recessed into the jamb edge flush with its surface, and they can be painted or otherwise finished to match the finish on the jamb. If the visibility of the screw heads on the face of the jamb is considered objectionable, the screws can be counter sunk into the jamb and covered with wood filler.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
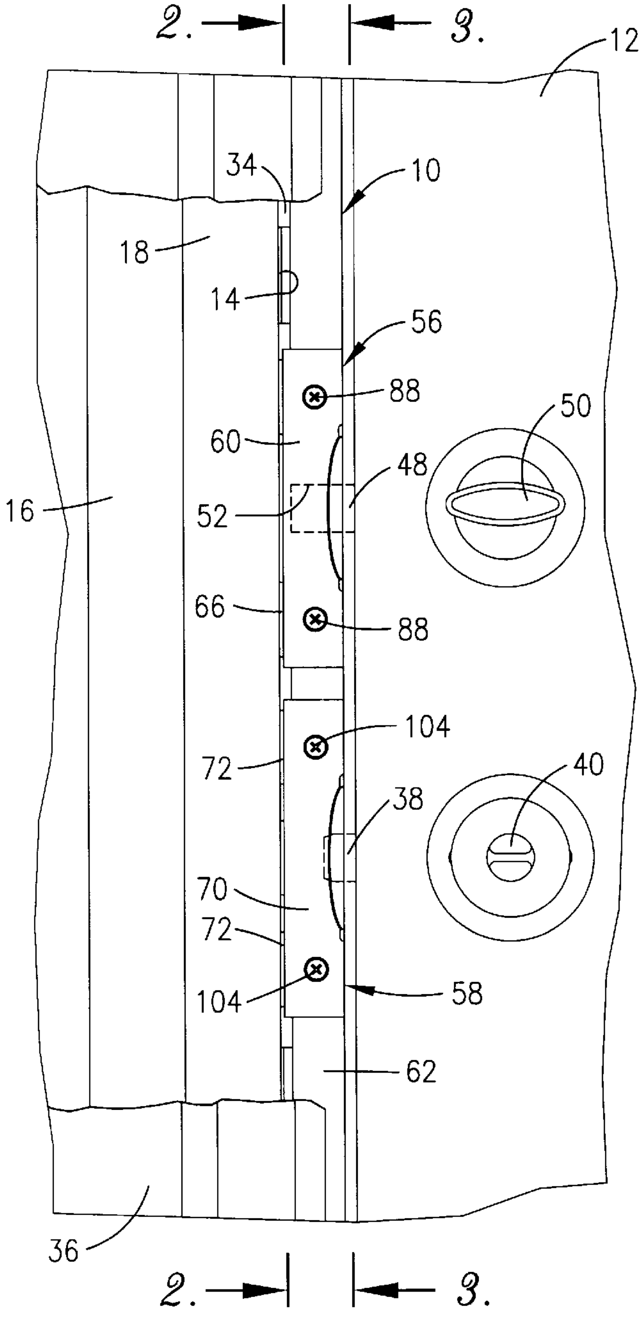
FIG. 1 is a fragmentary front elevational view of a door jamb constructed according to a preferred embodiment of the present invention, with the door shown closed and locked and the door casing broken away for purposes of illustration.

Referring now to the drawings in more detail and initially to FIG. 1 in particular, the present invention is directed to an improved door jamb which is generally identified by numeral 10 and which is intended primarily for use with a residential entry door such as the door 12. The jamb 10 is installed in a rough opening 14 which is formed by wall framing typically taking the form of two by four framing members such as a wall stud 16 and a trimmer stud 18 adjacent to the rough opening 14.

Figure 4:
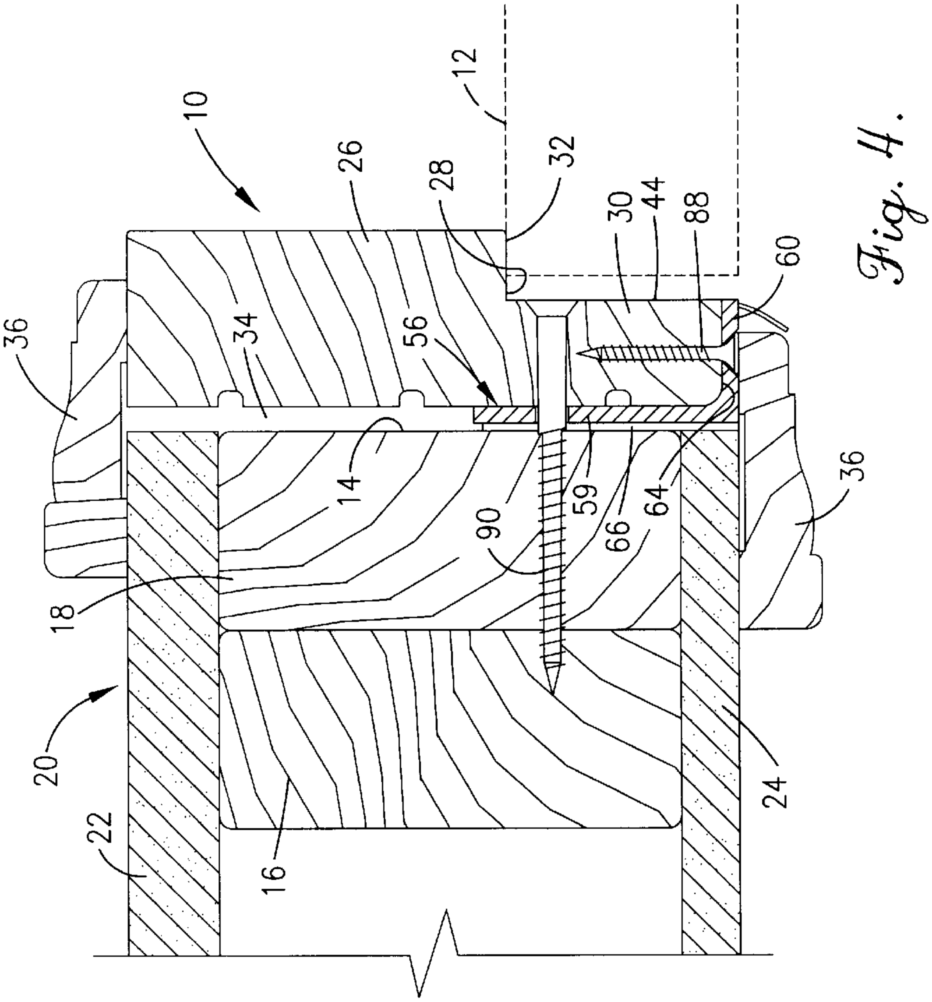
FIG. 4 is a fragmentary sectional view on an enlarged scale taken generally along line 4—4 of FIG. 3 in the direction of the arrows.
Figure 5:
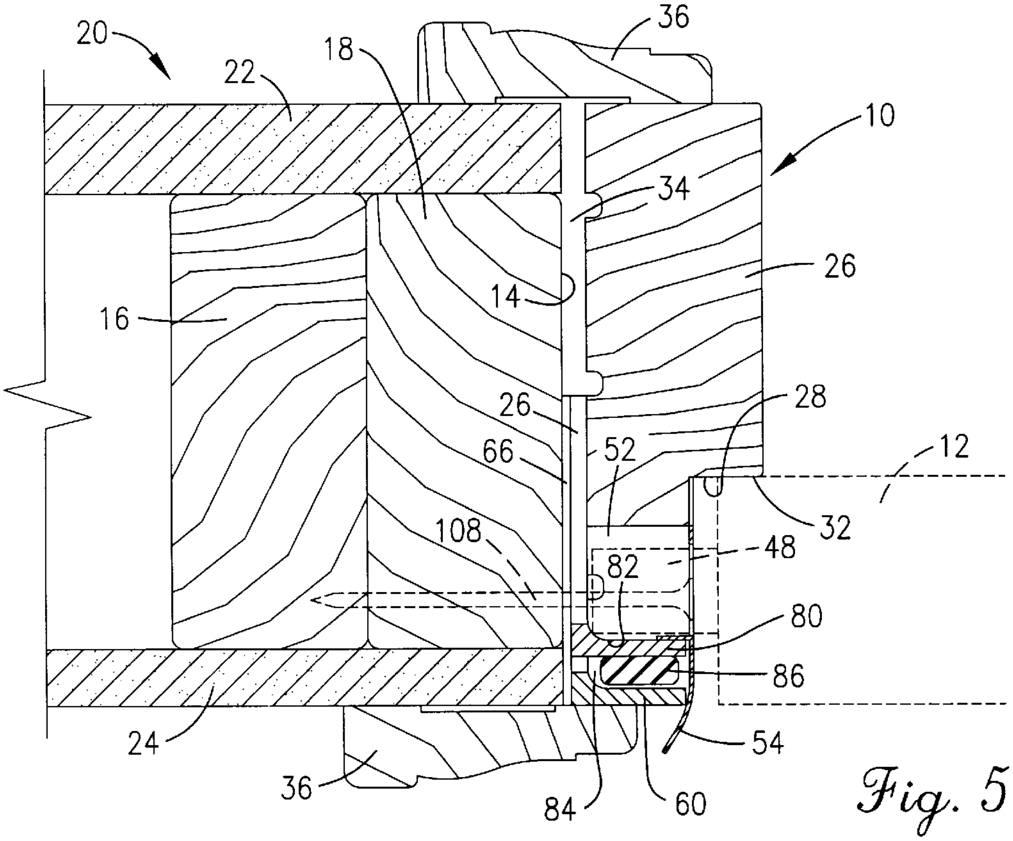
FIG. 5 is a fragmentary sectional view on an enlarged scale taken generally along line 5—5 of FIG. 3 in the direction of the arrows.
Figure 6:
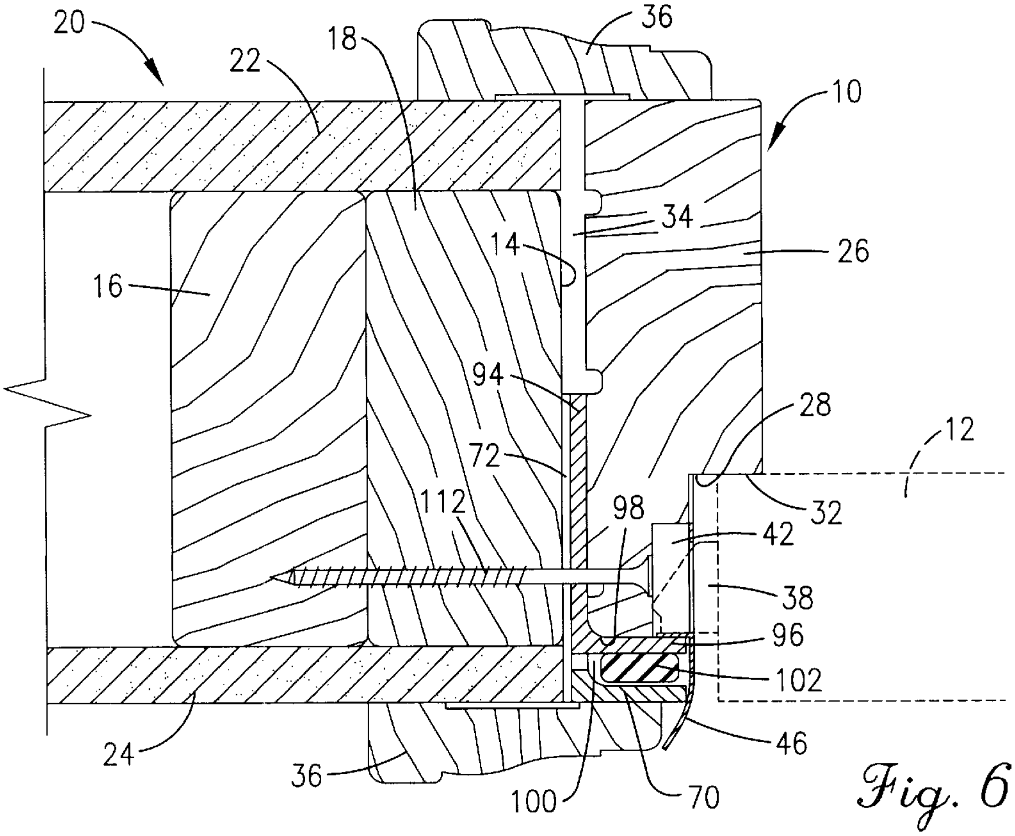
FIG. 6 is a fragmentary sectional view on an enlarged scale taken generally along line 6—6 of FIG. 3 in the direction of the arrows.

With additional reference to FIGS. 4–6, the studs 16 and 18 form part of a wall 20. The exterior surface of the wall 20 may be formed by any suitable material such as siding 22. The interior surface of the wall 20 may be covered by any suitable material such as wallboard 24. The jamb 10 is secured in the rough opening 14 and is normally wide enough to span the entire thickness of the wall 20 between the interior and exterior surfaces. Typically, the framing studs 16 and 18 are approximately 3½" wide, while the siding 22 may be ⅝" thick and the wallboard 24 may be ½" thick. In this situation, the jamb 10 is 4⅝" wide in order to position its edges flush with the finished inside and outside surfaces of the wall 20.

With continued reference to FIGS. 4–6, the jamb 10 has a body 26 which may be approximately 1¼" thick and provided with a mortise or recess 28 on its inside portion 30 (FIG. 4). The recess 28 provides a flat shoulder 32 which serves as a stop against which the door 12 butts when the door is in the closed position. A gap of typically ⅛"–¼" is provided between the edge of the door and the jamb portion 30 for clearance. The jamb portion 30 is typically ¾' thick and about 1½" wide in order to provide the recess 28 with sufficient width to receive the edge of the door 12.

A gap 34 is provided between the framing member 18 and the jamb 10 in order to allow the sides of the jamb to be shimmed to a plumb position and the top portion of the jamb to be shimmed to a level position. The gap 34 is normally between ⅛" and 3⁄16". Trim such as the moldings or casing 36 is installed to extend between the jamb and the finished wall surfaces in order to cover the gap 34.

As shown in FIG. 1, the door 12 is provided with a latch bolt 38 which is operated by a latching mechanism 40 controlled by doorknobs (not shown). The latch bolt 38 projects about ½" from the edge of the door 12 into a latch bolt passage 42 (see FIG. 3). The jamb body 26 has a flat face 44 which faces away from the framing members 16 and 18 toward the door 12. A strike plate 46 is mounted to the face 44 in the area of the bolt passage 42. The strike plate 46 may be mounted flush with the face 44 by recessing the strike plate into a mortised area of the face 44.

Referring again to FIG. 1 in particular, a dead bolt 48 forms a locking bolt for the door which is operated by a locking mechanism controlled by a finger lever 50. When extended, the dead bolt 48 extends approximately 1" from the edge of the door and is received in a locking bolt passage 52 (see FIG. 3) which extends into the face 44 of the door jamb body 26. A strike plate 54 is secured to the face 44 in the area of the bolt passage 52. The strike plate 54 is preferably mounted flush with the face 44 by recessing the strike plate in a mortise area.

In accordance with the present invention, a pair of relatively large L-shaped metal angle plates 56 and 58 are secured to the body 28 of the door jamb 10. As best shown in FIG. 4, the upper plate 56 includes a substantially flat body 59 and a flange 60. The door jamb body 26 presents an inside edge 62 (FIG. 1) which intersects with the face 44. As shown in FIG. 4, the edge 62 is provided with a mortise area 64 which receives the flange 60. The flange 60 extends along the edge 62 of the door jamb at a location to lie inwardly from the locking bolt passage 52. The body 59 of plate 56 extends within the gap 34 and may completely fill the gap. If it does not, the body 59 may be shimmed against the unexposed face of the jamb body 26 by shims 66 inserted between the stud 18 and the body 59.

The lower plate 58 is installed in a similar fashion in the area of the latch plate 46. Plate 58 has a flat body 68 (FIG. 2) and a flange 70 (FIG. 1). The flange 70 is secured in a mortise area formed in the edge 62 of the jamb body 26 in the area of the latch bolt passage 42. The body 68 extends into and may completely fill the gap 34. If necessary, shims 72 (FIG. 1) can be used to shim the body 68 tightly against the unexposed face of the jamb body 26.

Figure 2:
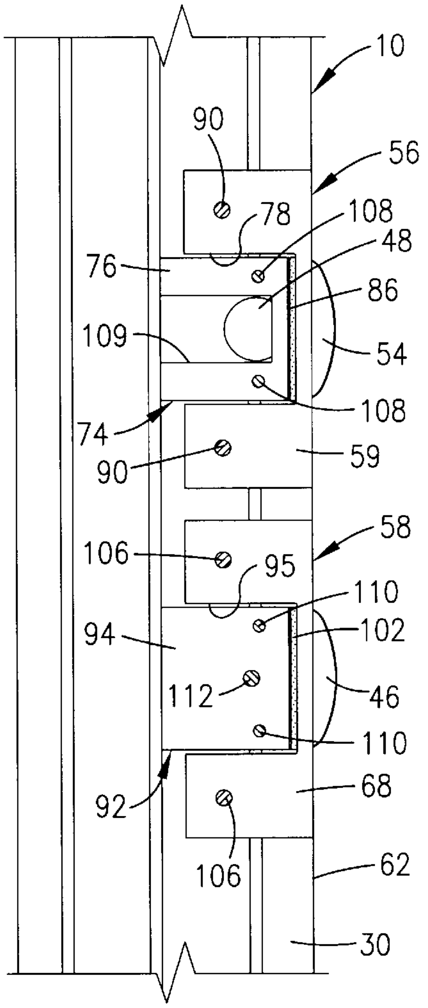
FIG. 2 is a fragmentary sectional view taken generally along line 2—2 of FIG. 1 in the direction of the arrows.

A relatively small L-shaped metal angle plate 74 cooperates with plate 56 to strengthen and reinforce the area of the jamb adjacent to the lock bolt passage 52. As shown in FIG. 2, plate 74 has a flat body 76 which extends within a cut out or recess 78 formed in the body 59 of plate 56. The body 56 is thus located in the gap 34 and may be secured against the unexposed face of the jamb body 26 by the shims 66. Extending from the body 76 of plate 74 is a flange 80 (see FIG. 5). In the area adjacent to the lock bolt passage 52, the jam edge 62 is provided with a mortise area 82 that is deeper than the mortise 64 which receives the flange 60. The mortise area 82 intersects with passage 52. Flange 80 is located in the mortise area 82 and forms the inside boundary of the bolt passage 52. Flange 80 is spaced inwardly from flange 60 to provide a space 84 between the flanges 60 and 80. A cushion 86 constructed of rubber or a similar shock absorbing substance is inserted into the space 84 and is retained in space 84 by the strike plate 54.

As shown in FIGS. 1 and 4, a pair of wood screws 88 extend through openings in the flange 60 and are screwed into the edge of the jam body 26 at locations above and below the relatively deep mortise area 82. A pair of long screws 90 (FIG. 3) extend through the jam body 26 and through the plate body 59 at locations above and below the recess 78 (see FIG. 2). As shown in FIG. 4, the screws 90 are long enough to extend well into the trimmer stud 18 and preferably extend completely through stud 18 and into stud 16. The screws 90 are set back well away from the edges of the framing members 16 and 18.

A relatively small L-shaped metal angle plate 92 cooperates with plate 58 to reinforce the door jamb in the area of the latch bolt 38. As shown in FIG. 2, plate 92 has a flat body 94 which occupies a recess 95 formed in the body 68 of plate 58. As shown in FIG. 6, plate 92 has a flange 96 oriented perpendicular to the body 92 and extending into a relatively deep mortise area 98 formed in the jamb edge 62 adjacent to the latch bolt passage 42. Flange 98 is spaced inwardly from flange 70 and forms the inside boundary of the latch bolt passage 42. A space 100 presented between flanges 70 and

98 receives a cushion 102 which is constructed of rubber or a similar material having good shock absorbing properties. Strike plate 46 encloses the cushion 102 within space 100.

As shown in FIG. 1, a pair of screws 104 extend through openings in flange 70 and are threaded into the edge 62 of the door jamb above and below the mortise area 98. Longer screws 106 extend into the face 44 through the jamb body 26 and through body 68 at locations above and below the recess 95 (see FIG. 2). Screws 106 preferably have the same length as the screws 90 so that screws 106 can be threaded well into the framing provided by the framing members 16 and 18.

Figure 3:
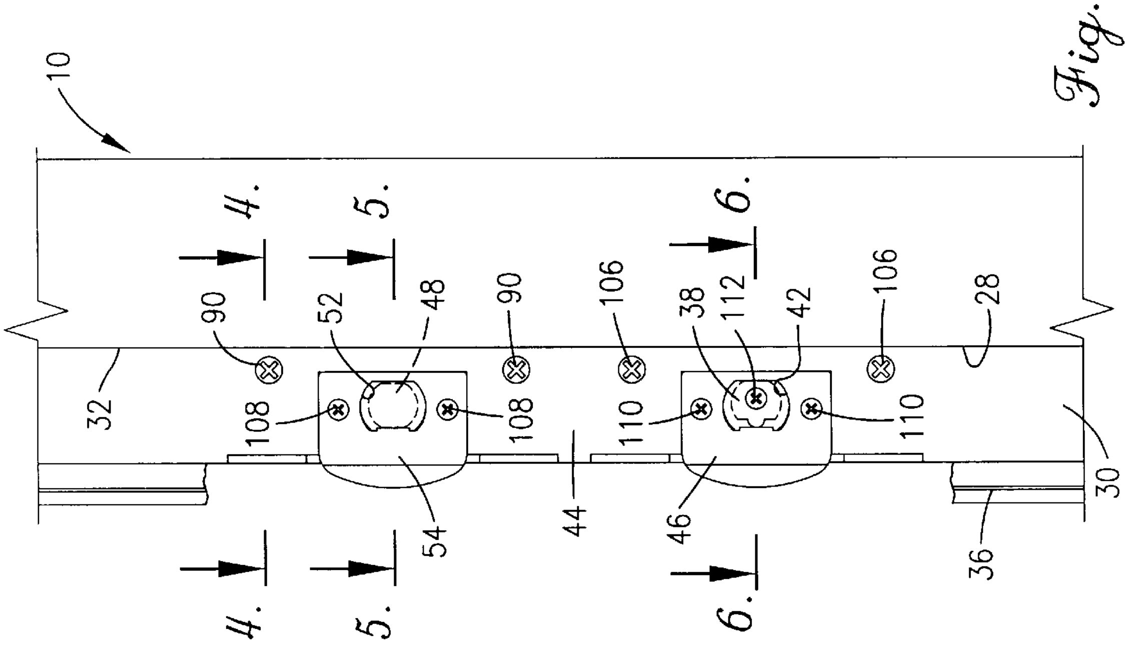
FIG. 3 is a sectional view taken generally along line 3—3 of FIG. 1 in the direction of the arrows, with a portion of the door casing broken away for purposes of illustration.

The strike plate 54 is secured to face 44 of the door jamb by a pair of long wood screws 108 (FIG. 3). The screws 108 also serve to secure plate 74 to the door jamb. As shown in FIG. 2, screws 108 extend through the body 76 of plate 74 at locations above and below a recess 109 formed in body 76 to provide clearance for extension of the dead bolt 48 through the passage 52. As shown in FIG. 5, the screws 108 extend into and preferably through framing stud 18 and into stud 16.

Plate 92 is similarly secured to the jamb body by a pair of screws 110 (FIG. 3) which also secure the strike plate 46 to the door jamb. As shown in FIG. 2, screws 110 extend through the door jamb and through the body 94 into the framing members 16 and 18, preferably to the same extent as the screws 106. As best shown in FIG. 6, an additional screw 112 may extend from the base of the latch bolt passage 42 through the jamb body 26, through plate 94, into and through stud 18, and into stud 16.

The door jamb of the present invention can be constructed at a factory, or it can be constructed by modifying a door jamb that is already installed. In the latter case, the casing or molding 36 should be removed, as should the strike plates 46 and 54. The relatively shallow mortise areas which contain the flanges 60 and 70 can be formed in the exposed edge 62 of the jamb body 26. The deeper mortise areas 82 and 98 can be formed in alignment with the passages 52 and 42 and made long enough to receive the flanges 80 and 96.

The smaller steel angle plates 74 and 92 can be installed with the bodies 76 and 94 entering the gap 34 and the flanges 80 and 96 inserted in the base portions of the mortise areas 82 and 98. Shims can be applied to shim the bodies of the small plates tightly against the unexposed face of the jamb if necessary. The rubber cushions 86 and 102 can be placed against the flanges 80 and 96, and the larger angle plates 56 and 58 can then be installed with the recess 78 receiving body 76 and the recess 96 receiving body 94. The bodies 59 and 68 extend into the gap 34 and may be shimmed tightly against the unexposed side of the jamb if necessary. The relatively shallow mortise areas in which flanges 60 and 70 are received hold them outwardly from flanges 80 and 96.

The screws 88 and 104 can then be installed to secure the larger plates 56 and 58 to the jamb edge 62. Screws 90 and 106 may be applied to secure the larger plates 56 and 58 to the wall framing. Finally, screw 112 can be applied and the strike plates 46 and 54 can be applied and secured with the long screws 110 and 108 which also secure the bodies of the smaller plates 92 and 74.

When the door is closed, the latch bolt 38 enters the bolt passage 42 and acts against the flange 96 as shown in FIG. 6. As shown in FIG. 5, when the dead bolt 48 is extended into passage 52, it bears against flange 80. Any attempt to kick in or otherwise forcefully open the door 12 causes the latch bolt 38 to act against flange 96 and the dead bolt 48 to act against flange 80. Because the flanges are parts of the metal plates, and because the metal plates are secured to the jamb and to the wall framing, the bolts 38 and 48 cannot be driven through the door jamb to release the door.

If the dead bolt 48 should bend or otherwise deform the strike plate 54 or flange 80, the cushioning and shock absorbing effect provided by the rubber cushion 86 cushions the force that is transmitted to the flange 60 of the large plate 56. Thus, the presence of the two flanges 60 and 80 on the edge portion of the door jamb, particularly when combined with the shock absorbing effect provided by the cushion 86, resists any tendency for the dead bolt to tear through the door jamb and release the door. A similar effect occurs with the plates 58 and 92 and the cushion 102 associated with the latch bolt 38.

In addition to this strengthening and reinforcement of the edge of the door jamb immediately adjacent to the bolt passages 42 and 52, the bodies of all of the plates extend in and substantially fill the gap 34 to provide significant reinforcement and structural backing for the door jamb in the otherwise vulnerable areas near the bolt passages 42 and 52. The angle shape of the plates enhances their strength and resistance to deformation.

The area of wooden door jamb between the bolt passages and the edge of the jamb is particularly vulnerable. With reference to FIG. 4 in particular, it is noted that the wall board 24 is the only material which backs the jamb body 26 in this part of the jamb. The present invention provides double flanges in this otherwise vulnerable area of the door jamb and also provides the bodies of the plates as backing materials which are able to resist any tendency for the jamb to fail at this location.

When the casing or molding 36 is in place, only a small part of each flange 60 and 70 is visible. The flanges are flush with edge 62 of the jamb, and they can be painted or otherwise finished in the same manner as the jamb so as to be inconspicuous. The heads of the screws 90 and 106 are indicated as being visible in FIG. 3 on the face 44 of the jamb. If the screws are considered objectionable, the screw heads can be counter sunk and covered with wood filler.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A door jamb for installation in a door opening surrounded by framing for a door having a bolt, said jamb comprising:

a jamb body for attachment to the framing, said jamb body having an edge and a face;

a bolt passage extending into said face for receiving the bolt;

a pair of metal plates attached to said jamb body adjacent to said edge and bolt passage in a manner to present a space between said plates; and a cushion in said space for absorbing shocks applied to said plates.

2. A jamb as set forth in claim 1, wherein each of said metal plates comprises a plate member having a substantially flat body and a flange extending from the body of the plate member, said space being formed between said flanges.

3. A jamb as set forth in claim 2, wherein:

said body of one plate member includes a recess; and said body of the other plate member is located in said recess.

4. A jamb as set forth in claim 1, wherein said edge of the jamb body has a recess in which said metal plates are located.

5. A doorway construction for a door having a bolt, said doorway construction comprising:

framing defining a door opening for the doorway;

a jamb body attached to the framing, said jamb body having a face facing into the door opening and an edge intersecting with said face;

a bolt passage extending into said face for receiving the bolt;

a first metal plate secured to said jamb body, said first plate having a flange extending generally along said edge and a flat body extending between said jamb body and framing;

a second metal plate having a flat body secured to said jamb body and having a flange spaced from said flange of the first plate; and a cushion between the flanges of said first and second plates for absorbing shocks applied thereto.

6. A doorway construction as set forth in claim 5, including a plurality of fasteners extending through said jamb body and through the bodies of said first and second plates into the framing.

7. A doorway construction as set forth in claim 5, including a plurality of fasteners extending through the flange of said first plate and into said edge of the jamb body.

8. A doorway construction as set forth in claim 7, including a plurality of fasteners extending through said jamb body and through the bodies of said first and second plates into the framing.

9. A doorway construction as set forth in claim 5, including:

a recess in said edge of the jamb body in which said flanges and cushion are located; and a pair of fasteners extending through said flange of said first plate and into said edge of the jamb body on opposite sides of said recess.

10. A doorway construction as set forth in claim 5, including a recess in the body of said first plate at a location aligned with the bolt passage, said body of the second plate being located in said recess.

* * * * *